United States Patent [19]
Artes et al.

US005322829A

[11] Patent Number: 5,322,829
[45] Date of Patent: * Jun. 21, 1994

[54] RESID HYDROTREATING CATALYST AND PROCESS

[75] Inventors: David C. Artes, Brookfield; Simon G. Kukes, Naperville, both of Ill.

[73] Assignee: Amoco Corporation, Chicago, Ill.

[*] Notice: The portion of the term of this patent subsequent to Jun. 22, 2010 has been disclaimed.

[21] Appl. No.: 31,656

[22] Filed: Mar. 15, 1993

[51] Int. Cl.$^5$ .................. B01J 23/74; B01J 23/85; B01J 23/88; B01J 23/28
[52] U.S. Cl. .................................................. 502/315
[58] Field of Search ............... 502/254, 255, 256, 257, 502/314, 315, 439

[56] References Cited

U.S. PATENT DOCUMENTS

| | | | |
|---|---|---|---|
| 4,212,729 | 7/1980 | Hensley et al. | 208/210 |
| 4,297,242 | 10/1981 | Hensley et al. | 502/220 |
| 4,395,329 | 7/1983 | LePage et al. | 502/313 X |
| 4,414,141 | 11/1983 | Schindler | 502/314 |
| 4,707,466 | 11/1987 | Beaton et al. | 502/313 |
| 4,797,195 | 1/1989 | Kukes et al. | 502/315 X |
| 5,009,771 | 4/1991 | Clark et al. | 502/314 X |
| 5,221,656 | 6/1993 | Clark et al. | 502/315 |

*Primary Examiner*—Helen M. S. Sneed
*Assistant Examiner*—Douglas J. McGinty
*Attorney, Agent, or Firm*—Scott P. McDonald; Richard A. Kretchmer

[57] ABSTRACT

A catalyst and process are disclosed for upgrading heavy feedstocks such as resid. The catalyst comprises a porous inorganic oxide support having an incremental pore volume maximum at a pore radius greater than 50 Angstroms bearing between 0.1 to 5.0 weight percent nickel and having at least 0.4 cc/g of pores having a radius less than 125 Angstroms. An ebullated bed hydroconversion process employing the catalyst also is disclosed.

13 Claims, 4 Drawing Sheets

1000°F+ CONVERSION (W/O) V. RUNTIME (DAYS)

RAMSBOTTOM CARBON ACTIVITY (LOG) V. RUNTIME (DAYS)

SULFUR ACTIVITY(LOG) V. RUNTIME(DAYS)

----- Co/Mo CONTROL
—— Ni/Mo INVENTION (0.5 W/O Ni)

NITROGEN ACTIVITY(LOG) V. RUNTIME(DAYS)

----- Co/Mo CONTROL
—— Ni/Mo INVENTION (0.5 W/O Ni)

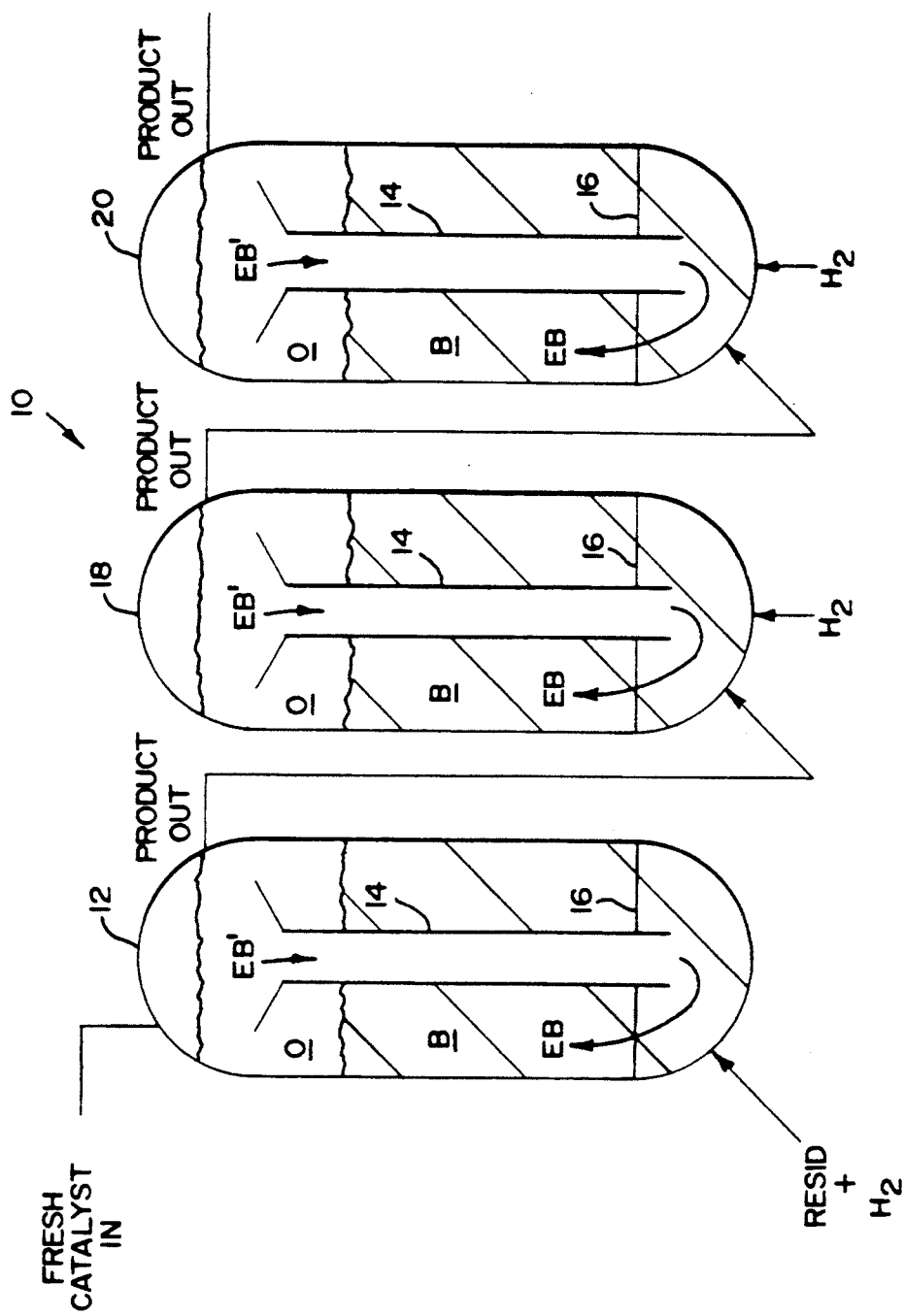

RESID HYDROTREATING CATALYST AND PROCESS

This invention relates to a catalyst and process useful for converting high molecular weight hydrocarbon feedstocks to relatively lighter molecular weight products. The invention more particularly relates to a catalyst and process especially useful for converting petroleum residuum and similar heavy feedstocks containing high amounts of metals and asphaltenes to more valuable, lighter molecular weight products.

BACKGROUND OF THE INVENTION

Efficient operation of modern refineries requires that refiners introduce larger and larger portions of heavier, poorer quality crude oils into refinery feedstocks. The widespread use of poorer quality crude oils in turn requires efficient processes and catalysts for converting heavy feedstock bottoms such as atmospheric and vacuum residua (hereafter "resid") to more valuable, lighter molecular weight products.

Resid conversion is difficult because resid feedstocks typically contain high concentrations of metals such as nickel, iron and vanadium as well as high concentrations of hetero atoms such as nitrogen and sulfur. Many of these metals and hetero atoms deactivate or poison hydrotreating catalysts used in resid conversion units. Poisoning of the catalyst often leads to the need for frequent catalyst additions or changeouts which impact unit availability and throughput.

Resid conversion also is difficult because resid feedstocks contain a large asphaltenic fraction that produces insoluble carbonaceous material when the feedstock is heated. These insoluble materials are known as Shell Hot Filtration Solids (hereafter "SHFS" or "Shell Solids") and are formed in greater degree at higher operating temperatures. Shell Solids impact operability by fouling and plugging system components. SHFS-induced operability problems generally occur as SHFS levels exceed about one weight percent within a resid conversion reactor. Formation of these solids, therefore, often results in feedstock or temperature operating limitations.

The operational impact of catalyst poisoning and SHFS formation has caused refiners to implement a variety of processes and catalysts in an effort to more efficiently convert resid feedstocks to more valuable, lighter molecular weight products.

In some cases, refiners have converted resid by employing multistage processes using different catalysts in each stage. For example, U.S. Pat. No. 4,297,242 to Hensley discloses a two-stage process in which the first stage employs a large pore, high surface area demetallation catalyst having a Group VIB and/or Group VIII metal deposed thereon and in which the second stage employs a relatively smaller pore second stage catalyst having a Group VI metal deposited on a catalytically-active alumina support. In Hensley's system, demetallation primarily occurs in a first stage reactor where metals are deposited on the large pore catalyst. Demetallized resid then flows to a second reactor where hydrogenation and molecular weight reduction occurs in the presence of the relatively smaller pore hydrogenation catalyst. Other somewhat similar two-stage upgrading processes are disclosed in U.S. Pat. Nos. 4,016,067; 4,212,729; 4,447,314 and 4,626,340. While multi-stage, multiple catalyst systems such as these provide one solution to many of the problems encountered in single stage, single catalyst systems, refiners desire other, simpler methods for upgrading resid to more valuable, lighter molecular weight products.

Another solution to upgrading resid is to employ a multi-component catalyst system in which catalyst particles of two different types are used in the same reactor. Examples of this type of process are disclosed in our U.S. Pat. Nos. 5,009,771 and 5,100,855. In these systems, a first catalyst component typically employs a porous refractory inorganic oxide support having less than 0.1 cubic centimeters per gram of pores with a diameter less than 200 Angstroms (the "micropores"), a pore volume of less than 0.02 cubic centimeters per gram of pores having a diameter greater than about 800 Angstroms (the "macropores"), and a maximum average mesopore diameter (i.e. pore diameter between 200 and 800 Angstroms) of about 130 Angstroms. The second catalyst component typically exhibits a pore volume of greater than 0.07 cubic centimeters per gram of pores having a diameter greater than about 800 Angstroms. Either catalyst can employ a Group V, VIB or VIII metal in an amount ranging from about 0.4 to 8.0 weight percent of the metal calculated as an oxide. This system is believed to work by causing metals to be deposited within the relatively large pore catalyst component, thereby substantially decreasing metal deposition on the relatively small pore component. This is believed to permit the small pore component to effectively upgrade feedstock much longer than would be possible if the large pore metal scavenging catalyst was not employed to prevent the blocking of small pore catalyst pore entrances.

A preferred method for improving the performance of resid upgrading systems is to employ a single hydrogenation catalyst having a wide variety of pore diameters within a single catalyst support. One example of a resid upgrading catalyst of this type is disclosed in U.S. Pat. No. 4,434,048 to Schindler. Schindler teaches the use of a support having between about 0.25 and 0.40 cubic centimeters per gram of pores having a radius of less than 125 Angstroms, between 0.10 and 0.25 cubic centimeters per gram of pores having a radius between 125 and 250 Angstroms, between 0.20 and 0.30 cubic centimeters per gram of pores having a radius between 250 and 750 Angstroms, between 0.05 and 0.15 cubic centimeters per gram of pores having a radius between 750 and 2000 Angstroms, and between 0.03 and 0.10 cubic centimeters per gram of pores having a radius greater than 2000 Angstroms. On this support is deposited between 1 and 6 weight percent nickel and between 5 and 16 weight percent molybdenum. In some cases, the catalyst may also include between 1 and 6 weight percent cobalt. While Schindler's catalyst may be somewhat easier to use than the multiple catalyst systems already described, the volume of micropores having a radius less than 125 Angstroms is believed to be substantially less than required for successful upgrading of resid in modern ebullated bed resid hydrotreating reactors of the types described herein.

Another example of a catalyst suitable for upgrading resid is that disclosed in our U.S. Pat. No. 4,707,466 to Beaton et al. This catalyst employs a porous inorganic support typically having at least 0.15 cubic centimeters per gram of pores with a diameter greater than 1200 Angstroms and about 0.5 cubic centimeters per gram of pores having a diameter of less than 150 Angstroms. Deposited on the support is about 3.5 to 5 weight percent of a Group VIB metal oxide and 0.4 to 0.8 weight percent cobalt oxide. We have found this catalyst to be particularly effective in ebullated bed reactor systems such as those disclosed in our U.S. Pat. Nos. 4,940,529 and 5,013,427 which are hereby incorporated by reference. As referred to herein, ebullated bed systems are those in which solid catalyst particles are kept in motion by the upward movement of liquids and gases. In these systems, a resid feedstock typically is converted to lighter products by ebullating a mixture of resid, hydrogen, recirculated liquid product and supported catalyst at temperatures around 800° F. and at total system pressures around 3000 psia in one or more reactors.

Another way to improve resid hydrotreating performance is to employ a catalyst having an incremental pore distribution specifically suited to resid hydroprocessing. One such catalyst is disclosed in our allowed U.S. patent application Ser. No. 07/857,336, now U.S. Pat. No. 5,221,651. This particular catalyst is characterized by a support having a maximum value of incremental pore volume at a pore radius of about 30 Angstroms. On this support is deposited between about 0.4 and 8 weight percent of a Group VIII metal and 3 to 22 weight percent of a Group VIB metal, both metals being measured as an oxide. The incremental pore volume noted above is calculated by dividing the change in pore volume for a given measurement increment by the change in pore radius for that increment to yield $dV/dr$, the rate of change of pore volume per gram with pore radius, and then multiplying $dV/dr$ by the average pore radius of the measurement increment in Angstroms to yield an incremental pore volume in cc/g. While this catalyst is believed to be well-suited to resid hydrotreating applications, interest remains high in other improved resid hydrotreating catalysts having different incremental pore volume distributions.

While the aforedescribed catalysts are believed to be particularly useful in ebullated bed resid hydrotreating reactors, we continue to search for improved catalysts that can provide for better operability and/or higher conversion under resid hydrotreating operating conditions.

SUMMARY OF THE INVENTION

It is an object of the present invention to provide an improved process and catalyst for resid hydrotreating.

It is another object of the invention to provide a catalyst for resid hydrotreating that provides improved Shell Hot Filtration Solid performance while at the same time providing good resid demetallation and conversion.

It is yet another object of the invention to provide a resid hydrotreating process employing a catalyst that provides improved Shell Hot Filtration Solid performance while at the same time providing good resid demetallation and conversion.

Other objects of the invention will be apparent as discussed herein.

The foregoing objects of the catalyst invention can be accomplished by preparing a catalyst bearing between 0.1 and 5.0 weight percent of nickel measured as an oxide and between 1 and 15 weight percent of a Group VIB metal such as molybdenum measured as an oxide on a porous, refractory, inorganic support. The support has a total surface area of greater than 150 m²/g, a total pore volume of between 0.8 and 1.4 cc/g, a pore volume of greater than 0.4 cc/g of pores having a diameter less than 125 Angstroms and an incremental pore volume maximum at a pore radius greater than about 50 Angstroms.

In some preferred embodiments, the pore volume of pores having a diameter of less than 125 Angstroms is at least 0.6 cc/gram to provide for improved hydrogenation performance. In other preferred embodiments, the weight percent of nickel deposited on the support is between about 0.4 and 0.9 weight percent. In still other preferred embodiments, the incremental pore volume maximum falls between 50 and 100 Angstroms.

The objects of the process invention are accomplished by introducing a resid feedstock into an ebullated bed reactor; ebullating the resid feedstock and hydrogen in the presence of the aforedescribed catalyst at a temperature between about 650° and 900° F., at a pressure of between 2650 and 3050 psi, and at a liquid hourly space velocity of between about 0.3 and 1.0 hr$^{-1}$; and withdrawing a hydrotreated process stream from the reactor. In some embodiments, two or more series connected reactors are used to provide improved conversion. In some embodiments, a second, different catalyst is used in a second series-connected reactor. In other multiple reactor embodiments, catalyst is transferred between the reactors to more efficiently utilize the demetallation and conversion capabilities of the catalyst.

BRIEF DESCRIPTION OF THE DRAWINGS

FIG. 7 is a flow diagram of an ebullated bed resid conversion process employing a Ni/Mo catalyst in accordance with the present invention.

DETAILED DESCRIPTION OF THE INVENTION

The catalysts and processes described herein are based on our unexpected discovery that at relatively low concentrations of hydrogenation metal, nickel produces superior Shell Solid performance when compared to equivalent amounts of cobalt when the cobalt and nickel are deposited on identical porous inorganic oxide supports having an incremental pore volume maximum at a pore radius of greater than 50 Angstroms.

The catalyst and process inventions described herein are well-suited to the processing of heavy hydrocarbon feedstocks such as atmospheric and vacuum resids obtained from the atmospheric and vacuum reductions of crude oil. While the catalysts described herein are believed to be useful for other hydroconversion applications and in fixed bed and other reactor configurations, the catalyst is believed to be particularly well-suited for use in the processing of resid feedstocks in ebullated bed reactor systems of the type described below.

Resid hydroprocessing catalyst in accordance with the present invention require a porous inorganic oxide support having a total surface area of greater than about 150 square meters per gram, a total pore volume of between 0.8 and 1.4 cc/g, a pore volume of greater than 0.4 cc/g of pores having a radius less than 125 Angstroms, and an incremental pore volume maximum at a pore radius of greater than about 50 Angstroms. Preferably, the catalyst exhibits a pore volume of between about 0.70 and 0.95 cc/g of pores having a diameter less than 1200 Angstroms, and a pore volume of between about 0.20 and 0.35 cc/g of pores having a diameter greater than 1200 Angstroms.

Figure 1:
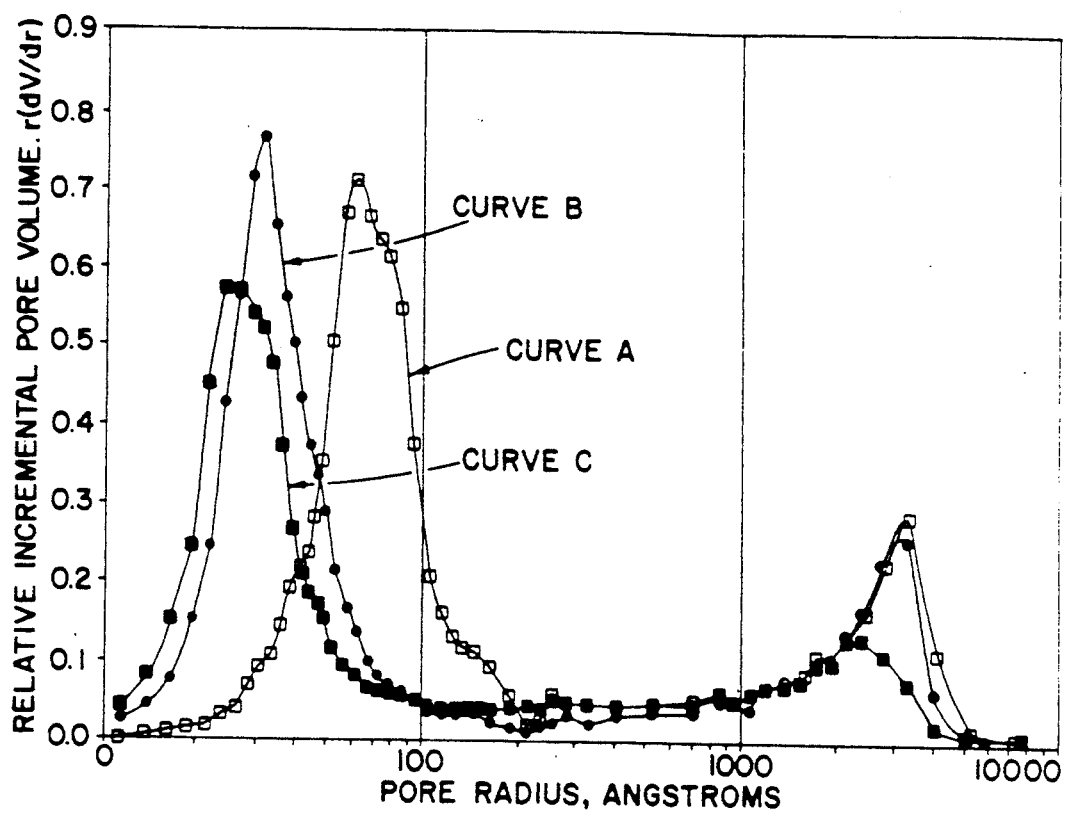
FIG. 1 is a plot of relative incremental pore volume, $(dV/dr) *(r)$ versus average pore radius in Angstroms for catalyst support in accordance with the present invention, for the catalyst disclosed in our allowed U.S. patent application Ser. No. 07/857,336, now U.S. Pat. No. 5,221,656, and for a third catalyst useful in a resid conversion process downstream of the catalyst invention disclosed herein.

A preferred incremental pore volume distribution of a catalyst support in accordance with the present invention is shown as Curve A in FIG. 1. Also depicted on FIG. 1 as Curve B is an incremental pore volume distribution representative of the support employed in our allowed U.S. Patent application Ser. No. 07/857,336, now U.S. Pat. No. 5,221,656. As can be seen by comparing Curves A and B, the incremental pore volume curve for the support in the present invention has a maximum at a pore radius of about 55–60 Angstroms while the invention claimed in our allowed application has a maximum at around 30 Angstroms. It is preferred that the pore volume of pores having a radius between 125 and 750 Angstroms be less than about 0.3 cc/g to maximize the more useful pore volume of pores with radii above and below this range. Table 1, below, lists cumulative pore volume as a function of pore radius for one exemplary support in accordance with the present invention.

TABLE 1

| CUMULATIVE PORE VOLUME (cc/g) | MEAN PORE RADIUS (Angstroms) |
|---|---|
| 0.0000 | 47596 |
| 0.0000 | 46486 |
| 0.0000 | 40812 |
| 0.0000 | 31053 |
| 0.0000 | 24232 |
| 0.0015 | 15830 |
| 0.0035 | 7551 |
| 0.0059 | 5286 |
| 0.0016 | 4069 |
| 0.0231 | 3311 |
| 0.0473 | 2800 |
| 0.0797 | 2428 |
| 0.1043 | 2139 |
| 0.1235 | 1916 |
| 0.1403 | 1726 |
| 0.1522 | 1567 |
| 0.1693 | 1396 |
| 0.1840 | 1212 |

TABLE 1-continued

| CUMULATIVE PORE VOLUME (cc/g) | MEAN PORE RADIUS (Angstroms) |
|---|---|
| 0.1938 | 1066 |
| 0.2043 | 953 |
| 0.2124 | 859 |
| 0.2375 | 710 |
| 0.2608 | 529 |
| 0.2795 | 408 |
| 0.2937 | 332 |
| 0.3047 | 281 |
| 0.3161 | 243 |
| 0.3266 | 213 |
| 0.3384 | 190 |
| 0.3481 | 172 |
| 0.3599 | 158 |
| 0.3818 | 140 |
| 0.4050 | 122 |
| 0.4343 | 107 |
| 0.4666 | 96 |
| 0.5132 | 87 |
| 0.5742 | 79 |
| 0.6807 | 71 |
| 0.7864 | 64 |
| 0.8754 | 59 |
| 0.9516 | 55 |
| 1.0216 | 51 |
| 1.0526 | 47 |
| 1.0708 | 43 |
| 1.0735 | 39 |
| 1.0767 | 38 |
| 1.0767 | 36 |
| 1.0784 | 34 |
| 1.0784 | 33 |
| 1.0799 | 32 |
| 1.0799 | 31 |
| 1.0801 | 30 |
| 1.0801 | 29 |
| 1.0801 | 28 |
| 1.0801 | 27 |
| 1.0801 | 26 |
| 1.0801 | 25 |
| 1.0801 | 24 |
| 1.0801 | 21 |
| 1.0801 | 19 |
| 1.0801 | 17 |
| 1.0801 | 16 |

Catalyst supports in accordance with the present invention can employ any of several known porous, refractory, inorganic oxide supports including alumina, silica, silica-alumina, silica-stabilized alumina, activated alumina, magnesia, boria, titania, zirconia or other similar materials. Such supports may be obtained commercially or prepared as described below.

One representative support for the catalysts disclosed herein can be prepared from a high surface area boehmite alumina gel support having a "needle-like" crystalline morphology. This gel is prepared by precipitating a solution of sodium aluminate and aluminum sulfate under carefully controlled conditions of pH, temperature, time and agitation. Details describing suitable conditions required to precipitate this support can be found on pages 37–46 of *Catalyst Supports and Supported Catalysts: Theoretical and Applied Concepts* by A. B. Stiles, published by Butterworths, Boston (1987), hereby incorporated by reference. Hydrated boehmite crystalline material prepared in the foregoing manner is then spray-dried at atmospheric pressure at temperatures above about 100° C. to form "microspheres" within the material. A peptizing agent such as nitric acid typically is added to effect microsphere packing geometry as discussed below.

Spray-dried support is then extruded to provide the required pore volume. Variables empirically altered during extrusion to obtain the desired size and pore volume of pores greater then 600 Angstroms in radius include applied shear stress and the concentration of peptizing agent applied during spray drying. Decreasing shear stress generally increases the size and pore volume of pores having a radius greater than 600 Angstroms. Increasing peptizing agent acidity and/or concentration typically results in decreased macroporosity. The somewhat unpredictable nature of support preparation requires that the product be monitored and variables empirically adjusted until the desired specifications are obtained.

The distribution of pores having a radius less than 600 Angstroms is affected by the temperature applied during a calcination step that follows extrusion. Although the calcination temperature may require empirical adjustment, temperatures in the range of 480°-540° C. are believed to be useful for obtaining pore volume distributions in accordance with the present invention. After calcination, the support is ready for metal deposition.

Deposited on the inorganic oxide support 15 between 1 and 15 weight percent of a Group VIB metal, preferably molybdenum, measured as an oxide, and between about 0.1 and 5 weight percent of nickel measured as an oxide. It is preferred that the weight percent of nickel range from 0.4 to 0.9 weight percent and that the weight percent of Group VIB metal range from 3.0 to 5.2 percent. The weight ratio of nickel to the Group VIB metal should range from 0.08 to 0.3 and preferably from 0.1 to 0.2. The Group VIB metal designation used herein is taken from the Periodic Table of the Elements as can be found on page 874 of *Webster's Ninth New Collegiate Dictionary*, published by Merriam-Webster, Inc., Springfield, Mass. (1991). As used herein, nickel metal concentrations may be converted to nickel oxide concentrations by multiplying by 1.2, and molybdenum metal concentrations may be converted to molybdenum oxide concentrations by multiplying by 1.5.

The required metals can be deposited on the support by impregnation, ion exchange, or any other means known in the art. An exemplary method is to impregnate an alumina support with a heat-decomposable (typically aqueous) metal solution, followed by air drying at 30° to 180° C. for a period of from about 0.2 to 24 hours followed thereafter by calcination at 400° to 650° C. for 0.5 to 20 hours. The metal solution used can include more than one metal, or multiple metals can be impregnated by serially applying and drying solutions of individual metals.

Preferably, the prepared catalyst contains no more than about 6.0 weight percent $SiO_2$, 0.06 weight percent $Na_2O$, and 1 weight percent $SO_4$. The total pore volume of pores having a diameter of less than 1200 Angstroms preferably should be between 0.75 to 0.90 cm$^3$/gram while the total pore volume of pores having a diameter of greater than 1200 Angstroms preferably should be between about 0.25 and 0.30 cm$^3$/gram, with a preferred BET surface area of 170-210 m$^2$/g. The compacted bulk density of the catalyst preferably should be between 26 and 32 lb/ft$^3$, and the individual catalyst particles preferably are between about 0.08 and 0.16 inches long and about 0.047 to 0.052 inches in diameter. Weight loss on ignition for one hour at 1000° F. should not exceed 1.5 weight percent.

The surprising Shell Solids performance of relatively low concentrations of nickel relative to cobalt is illustrated by the following Examples.

EXAMPLE 1

In Example 1, a 205 cc ebullated bed pilot plant reactor fitted with an internal recycle pump was loaded with 100 cc of fresh resid hydrotreating catalyst containing 0.64 weight percent cobalt and 3.1 weight percent molybdenum deposited as metals on a support in accordance with the present invention. The support exhibited an incremental pore volume distribution similar to that illustrated in FIG. 1 by Curve A. The BET surface area of the catalyst was about 205 square centimeters per gram, with a 20-50 Angstrom pore diameter surface area of 38 m$^2$/g, a 50-70 Angstrom pore diameter surface area of 135 m$^2$/g, a 70-150 Angstrom pore diameter surface area of 23 m$^2$/g and a 150-1200 Angstrom pore diameter surface area of 11 m$^2$/g.

The reactor used is capable of maintaining a nearly isothermal temperature profile (within 6° F.) and was operated at a thermal to catalystic ratio (T/C ratio) within the operating range of our commercial three-stage ebullated bed systems as disclosed in our U.S. Pat. Nos. 4,940,529 and 5,013,427. The T/C ratio is defined as the ratio of total reactor volume minus the volume of the catalyst support (not including interstitial and pore volumes) minus the reactor gas volume, all divided by the settled volume of the catalyst loaded in the reactor. The T/C ratio employed in this run was approximately 1.4. The reactor was run for a period of about 20 days at a liquid hourly space velocity of about 0.3 hr$^{-1}$ and at a temperature varying from about 800° to 805° F. The severity of the run was such that the conversion of materials boiling above 1000° F. at atmospheric pressure to materials boiling at less than 1000° F. was equivalent to that obtained by our three-stage commercial hydrotreaters mentioned above.

A commercially-blended resid containing about 18 weight percent Ramsbottom Carbon, 4.5 weight percent sulfur, 0.5 weight percent nitrogen, 250 ppm vanadium and 84 weight percent of material boiling above 1000° F. at atmospheric pressure was used as a feedstock.

The product Shell Solids, 1000° F.+ conversion, Ramsbottom Carbon, nitrogen and sulfur activities of the catalyst are plotted as a function of run time as indicated by the dashed lines in FIGS. 2-6 respectively. Shell Solids were measured using the methodology described in the *Journal of The Institute of Petroleum* (1951) V.37, pp. 596-604, by Van Kerkuoort and Niewstad. Conversion of 1000° F. boiling material was measured by gas chromatographic simulated distillation. Desulfurization, denitrogenation and Ramsbottom Carbon removal activities were calculated by trial and error integration of the following first order rate constant distributed backmixed kinetics equation:

$$dA = 100[1 - (a)(e^a)(Ej(a))]$$

where:
  dA = conversion in weight percent of sulfur, nitrogen or Ramsbottom Carbon $$a = \frac{LHSV}{k_x A_x T_f}$$

LHSV = catalytic space velocity (hr$^{-1}$)

$k_x$ = kinetic constant at 800° F. for removal of sulfur, nitrogen or Ramsbottom Carbon $A_x$ = catalyst activity for removal of sulfur, nitrogen or Ramsbottom Carbon $T_f$ = a temperature factor = $\exp [E_x/1.987] (1/1259.7 - 1/T)$ ]where $E_x$ = activation energy for removal of sulfur, nitrogen or Ramsbottom Carbon $E_x$ = 54,000 Btu/mole for desulfurization $E_x$ = 49,000 Btu/mole for denitrogenation $E_x$ = 80,000 Btu/mole for Ramsbottom Carbon removal T = temperature in degrees Rankin Ej(a) = Exponential integral (see e.g. Abromowitz, M. and Stegun, I.A., *Handbook of Mathematical Functions*, Dover, N.Y., 1968, page 231.)

EXAMPLE 2

Example 2 was conducted under conditions substantially identical to Example 1 but employed three nickel/molybdenum catalysts in accordance with the present invention. The catalysts employed supports substantially identical to the support employed in Example 1 but incorporated 0.54 weight percent of nickel and 3.3 weight percent of molybdenum, 1.66 weight percent of nickel and 3.5 weight percent of molybdenum, and 2.6 weight percent of nickel and 9.1 weight percent of molybdenum respectively, all weight percents being the weight percent of the metal specified. The product Shell Solids, 1000° F.+ conversion, Ramsbottom Carbon, nitrogen and sulfur activities of the 0.54 weight percent molybdenum catalyst are plotted as a function of run time as indicated by the solid lines in FIGS. 2-6, respectively. The product Shell Solids for the 1.7 and 2.6 weight percent nickel catalysts also appear on FIG. 2.

Figure 2:
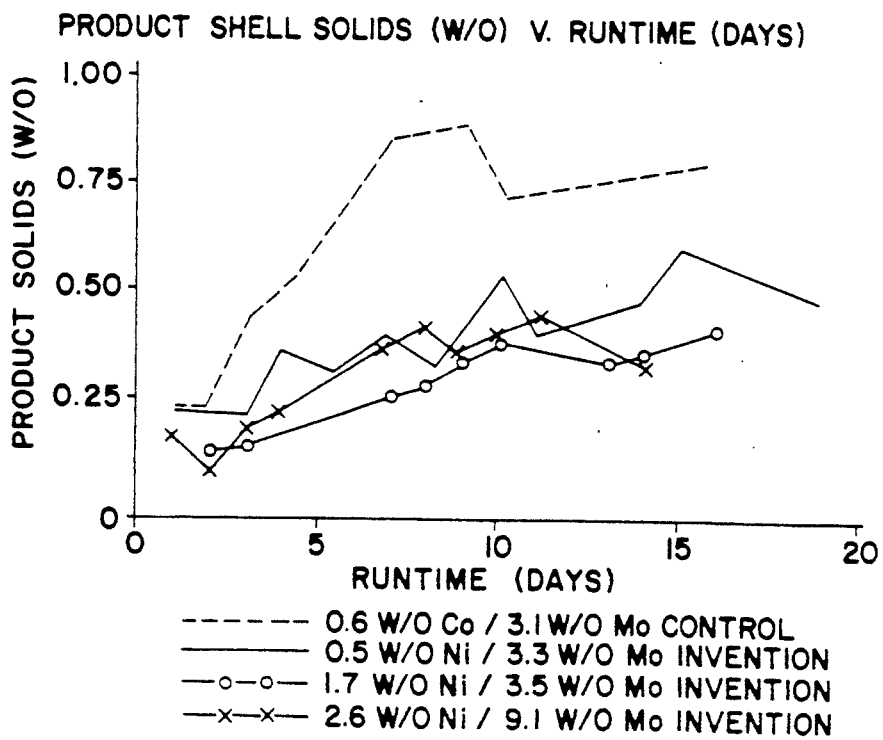
FIG. 2 is a plot comparing the Shell Solid performance of three Ni/Mo catalysts in accordance with the present invention to the performance of a Co/Mo control catalyst.
Figure 3:
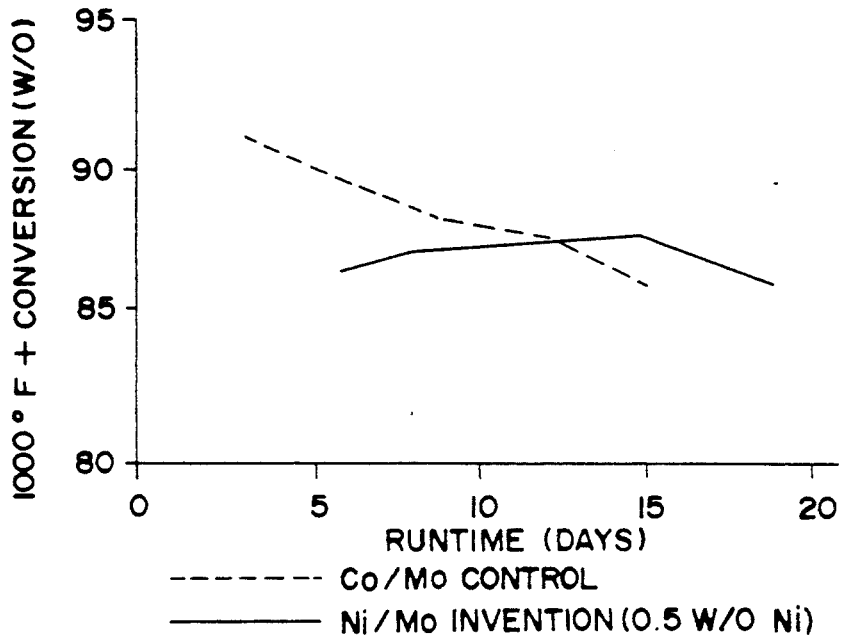
FIG. 3 is a plot comparing the 1000° F. plus resid conversion performance of a Ni/Mo catalyst in accordance with the present invention to the performance of a Co/Mo catalyst having similar metals concentrations deposited on an identical support.
Figure 4:
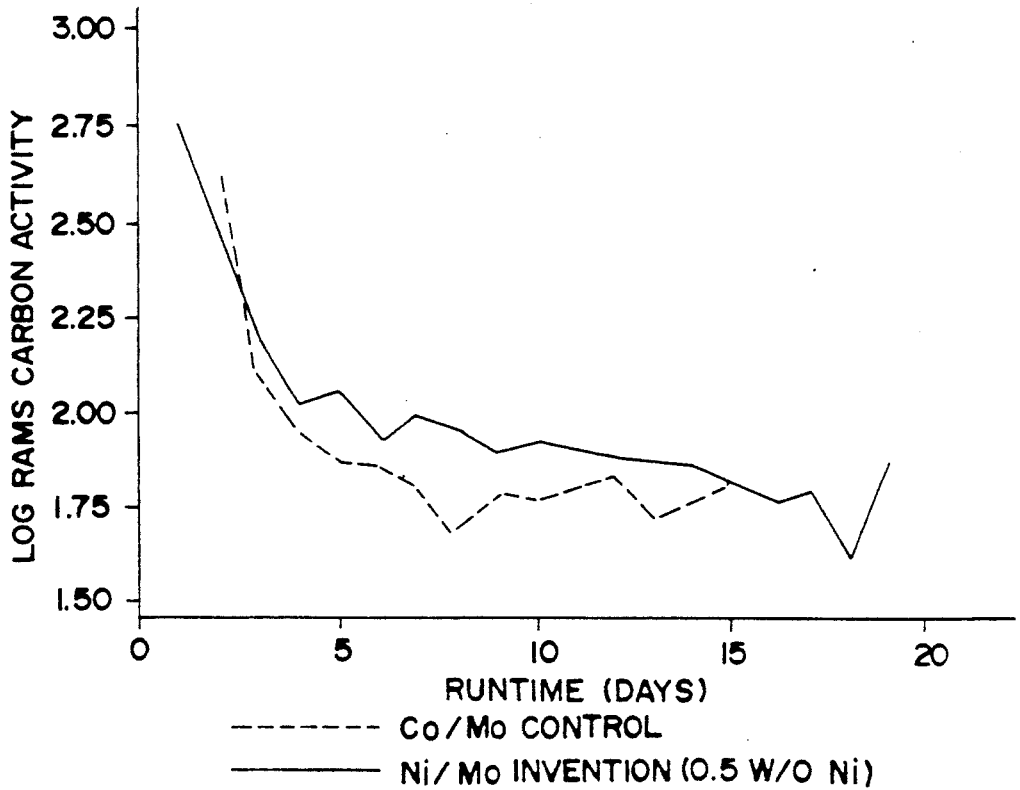
FIG. 4 is a plot comparing the Ramsbottom Carbon activity of a Ni/Mo catalyst in accordance with the present invention to the performance of a Co/Mo catalyst having similar metals concentrations deposited on an identical support.
Figure 5:
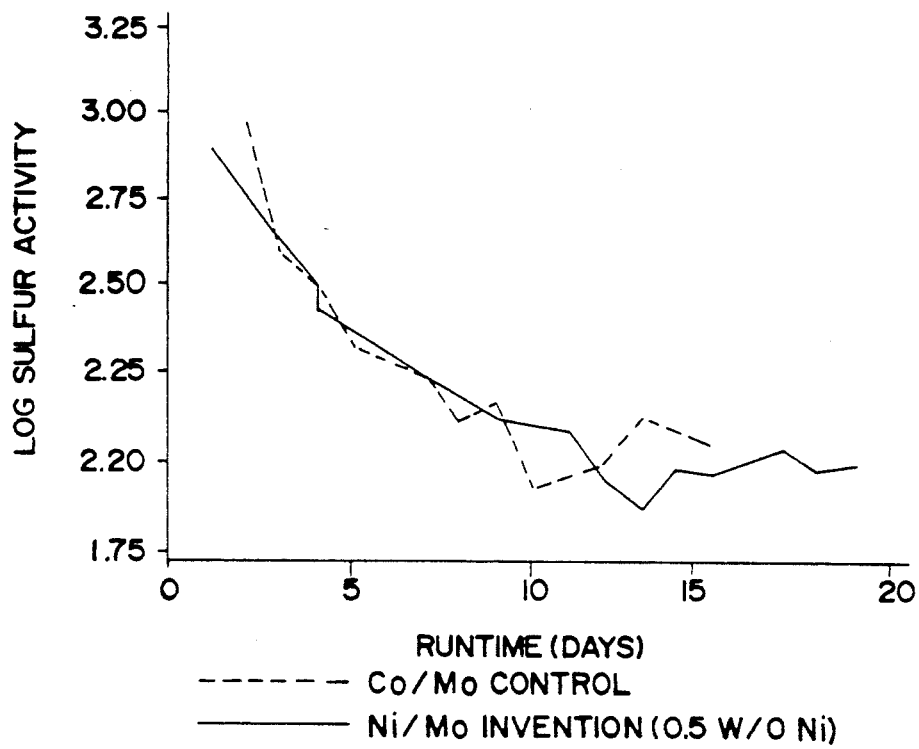
FIG. 5 is a plot comparing the sulfur activity of a Ni/Mo catalyst in accordance with the present invention to the performance of a Co/Mo catalyst having similar metals concentrations deposited on an identical support.
Figure 6:
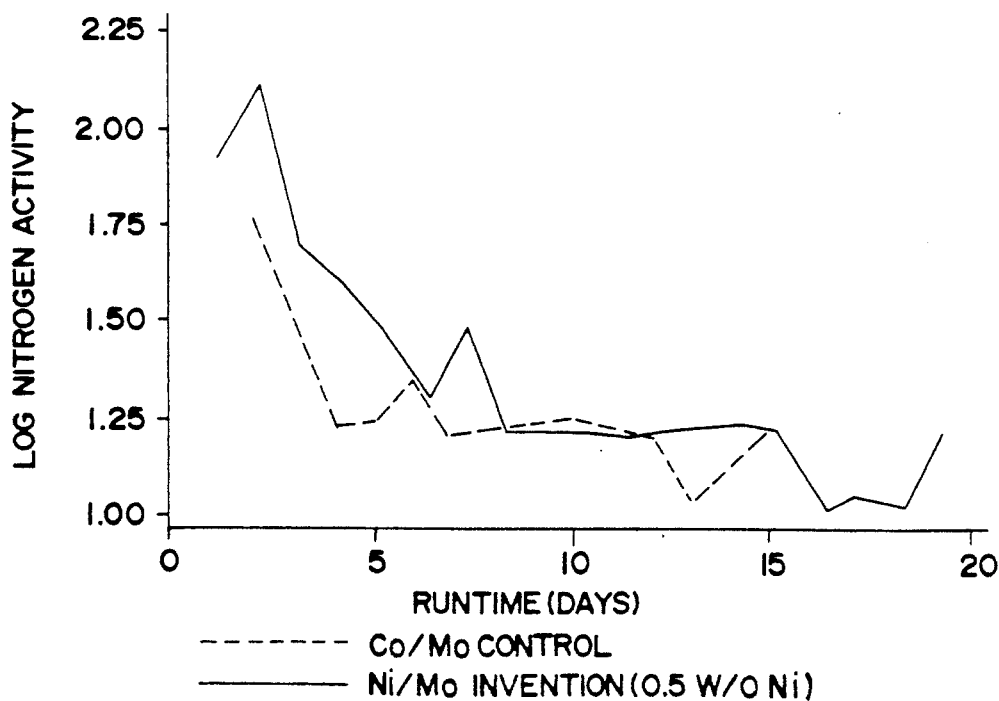
FIG. 6 is a plot comparing the nitrogen activity of a Ni/Mo catalyst in accordance with the present invention to the performance of a Co/Mo catalyst having similar metals concentrations deposited on an identical support.

As can be seen by comparing the results plotted in FIG. 2, each of the nickel/molybdenum catalysts tested yielded product Shell Solids concentrations between about 0.3 to 0.5 weight percent, a result about one half or less the magnitude of the Shell Solids found in the cobalt/molybdenum catalyzed run. Because SHFS-induced operability problems generally occur as Shell Solids levels exceed about one weight percent within a resid conversion reactor, substituting our nickel/molybdenum catalyst invention in a resid hydrotreating reactor should permit operation with heavier feedstocks and/or at higher temperatures than would be possible when employing the cobalt/molybdenum catalyst of Example 1.

As can also be seen by comparing FIGS. 3-6, the sulfur, nitrogen and 1000°+Fahrenheit conversion of the cobalt and 0.54 weight percent nickel catalysts were about equal, with the 0.54 weight percent nickel/-molybdenum catalyst invention showing a small but consistently higher activity for Ramsbottom Carbon removal.

Examples 1 and 2 unequivocally illustrate that catalysts in accordance with the present invention having relatively low concentrations of nickel (i.e. less than one weight percent) deposited thereon can provide better SHFS and Ramsbottom Carbon performance than otherwise identical cobalt/molybdenum catalysts when used in resid hydrotreating applications. These Examples also indicate that equivalent catalyst performance can also be obtained at higher nickel weight percents up to at least 2.6 weight percent nickel measured as a metal although the lower nickel concentrations below about 1 percent are preferred as they simplify catalyst preparation and make preparation more economical.

EXAMPLE 3

Example 3 was conducted under conditions similar to but less severe than those of Examples 1 and 2. In this example, a variety of nickel/molybdenum catalysts in accordance with the present invention were prepared to test the effect of nickel loading on various performance parameters. Each of the five runs in Example 3 was conducted using 95 cc of a Ni/Mo catalyst. The catalysts used employed Ni/Mo weight percents of 0.54/3.3, 0.98/2.9, 1.66/3.5, 2.60/9.1 and 3.57/2.80, respectively, measured as metals. The runs were conducted at an LHSV of about 0.9 hr$^{-1}$, at a temperature between about 810°-815° F., and at about 2000 pounds pressure. The runs lasted between 7 and 21 days depending on the catalyst employed. The severity of the runs simulated the severity of the first stage of a three-stage resid hydrotreating system of the type already discussed.

A commercially-blended resid containing about 17.7 weight percent Ramsbottom Carbon, 4.1 weight percent sulfur, 0.5 weight percent nitrogen, 280 ppm vanadium and 84 weight percent of material boiling above 1000° F. at atmospheric pressure was used as a feedstock.

Surprisingly, no substantial differences in catalyst performance as a function of nickel loading could be detected with respect to Shell Solids or Ramsbottom Carbon performance, or with respect to vanadium activities. Hetero atom activities were slightly higher for the 2.60/9.1 Ni/Mo catalyst. The foregoing parameters generally followed the trends shown in FIGS. 2-6, with the metal, hetero atom, Ramsbottom Carbon, and Shell Solid activities having absolute values around about 80 percent of those shown in FIGS. 2-6 because of the less severe test conditions.

Our catalyst invention is believed to be particularly well-suited to operation in a resid hydrotreating unit (RHU) which preferably includes multiple trains of series-connected ebullated bed reactors. A representative train 10 of such an RHU is shown in FIG. 7. Train 10 hydroprocesses a heavy feedstock such as resid in the presence of fresh and/or equilibrium hydrotreating catalyst and hydrogen to produce an upgraded product stream. Hydroprocessing in this manner removes metals, nitrogen, oxygen, sulfur and Ramsbottom Carbon from feed material as well as hydrocracking and saturating the feed material. Detailed information concerning the construction and operation of a similar RHU is contained in our U.S. Pat. Nos. 4,940,529 and 5,013,427, the disclosures of which have already been incorporated by reference.

Ebullated bed reactors of the type shown in FIG. 7 maintain a solid catalyst inventory in random motion by providing an upward flow of liquids and gases within the reactor. These reactors typically have a gross volume of from 10 to 70 percent greater than the volume of the solids contained therein when the solids are in a settled state. The ebullation in these reactors preferably is maintained by introducing a recycle feed, including any recycle flow, at linear velocities of about 0.02 to 0.4 feet per second and preferably at from about 0.05 and 0.20 feet per second.

Reactor train 10 includes three series-connected ebullated bed hydrotreating reactors and associated fractionating equipment. A hydrogen-rich feed gas preferably containing at least 96 percent molecular hydrogen by volume is heated to between about 650° and 900° F. and introduced into the lower portion of a first ebullated bed hydrotreating reactor 12 along with the relatively heavy resid feedstream. If desired, the feedstream may contain about 4 parts resid and up to about 1 part of a solvent such as decanted oil (DCO) from a fluidized catalytic cracking unit or a resin fraction from a solvent extraction deasphalting unit. The feedstream is heated to between about 650° and 750° F. before it is introduced near the bottom of reactor 12. Inside reactor 12 fresh or equilibrium hydrocracking catalyst of the type already described is ebullated through the heated solvent/resid mixture at a temperature between about 700° and 850° F., at a total vessel pressure between about 2650 and 3050 psia and at hydrogen partial pressure between about 1800 and 2300 psia. Residence times within the first and subsequent hydrotreating reactors typically range from 0.3 to 1.0 hr$^{-1}$ LSHV each.

Catalyst, hydrogen-rich gas and the heated feedstream circulate upwardly in reactor 12 through an expanded catalyst bed B in the direction of arrow EB, with hydrotreated product and hydrogen-rich gas being withdrawn from near the top of vessel 12. A portion of the oil product O is drawn downwardly in the direction of arrow EB' through a downcomer 14 by a recycle pump (not illustrated) and is used to ebullate bed B by forcing the recycle stream upwardly across a distributor plate 16. Plate 16 preferably includes a plurality of bubble caps and risers (not illustrated) for evenly distributing circulating oil and gas more uniformly across reactor 12.

An upgraded process stream from first reactor 12 is transferred to a second ebullated bed reactor 18. If desired, a quench liquid such as sponge oil or a quench gas such as a mixture of upgraded methane-lean gases and/or fresh makeup gases may be added to the process stream prior to the process stream entering second reactor 18. This mixture is ebullated in the presence of hydrocracking catalyst preferably removed from a third downstream reactor 20. Hydrotreating conditions within reactor 18 preferably include an operating temperature between about 700° and 850° F., a total vessel pressure between about 2600 and 3000 psia, and a hydrogen partial pressure between about 1700 and 2100 psia.

An upgraded process stream from second reactor 18 is transferred to third reactor 20 with or without liquid or gas quench as already discussed. The process stream again is ebullated in the presence of hydrocracking catalyst at a temperature between about 700° and 850° F., at a total vessel pressure between about 2250 and 2950 psia, and at a hydrogen partial pressure between about 1600 and 2000 psia to produce a further-upgraded process stream.

The process stream from third reactor 20 can be fractionated by any of several methods well known in the art. The process stream typically is transferred with or without liquid or gas quench to a high temperature separator operating between about 700° and 850° F. at a pressure between about 2500 and 2900 psia. The separator yields an overhead stream of gases and oil vapors and a high temperature heavy oil fraction. The oil fraction typically passes to a flash drum system and is distilled in an atmospheric tower. The bottoms fraction from the atmospheric tower can be heated and further fractionated in a vacuum tower which yields as its bottoms fraction hydrotreated resid. This resid routinely contains predominantly material boiling above about 850° F. and preferably boiling above about 1000° F. at atmospheric pressure. RHU conversion to 1000° F. minus products preferably is at least 65 percent by volume.

It has been found that efficient operation of a train of three series-connected ebullated bed reactors such as those shown in FIG. 7 can be enhanced by the appropriate selection and management of the catalysts employed in each reactor. One particularly efficient catalyst management system is to introduce fresh catalyst in accordance with the present invention into first reactor 12 as needed. A fraction of spent catalyst is removed from reactor 12 and reclaimed as fresh catalyst is added. Partially spent catalyst from third reactor 20 is removed from reactor 20 at a rate of about 0.5 to 3.0 percent per day of the reactor inventory and transferred to second reactor 18, where its remaining capacity is depleted prior to removing catalyst from reactor 18 for reclamation. Fresh catalyst is added to third reactor 20 as required to maintain the desired catalyst inventory therein.

Overall train performance has been found to be improved when a second, different catalyst is used in second reactor 18 and third reactor 20. A particularly useful catalyst for adding to third reactor 20 is a catalyst having a porous, refractory inorganic oxide support having a peak in its incremental pore volume curve less than about 50 Angstroms and preferably less than about 30 Angstroms. The catalyst preferably should contain between about 1 to 5 weight percent of a hydrogenation metal, preferably about 3 to 4 weight percent nickel, as well as about 10 to 16 weight percent of a promoter such as molybdenum or another Group VIB metal, all measured as metals. A suitable relative incremental pore distribution for the second catalyst is shown as Curve C on FIG. 1.

While the use of a series of ebullated bed hydrotreating reactors such as those just discussed is preferred, other hydrotreating processes in accordance with these inventions using one or more reactors will be apparent to those skilled in the art after reviewing this disclosure.

The foregoing catalyst and process descriptions are intended to be exemplary, and the scope of the invention is intended to be limited only by the following claims.

We claim:

1. A resid hydroprocessing catalyst for use in an ebullated bed hydroprocessing reactor consisting essentially of
   a porous inorganic oxide support having a total surface area of greater than about 150 square meters per gram, a total pore volume of between 0.8 and 1.4 cc/g, a pore volume of greater than 0.4 cc/g of pores having a radius less than 125 Angstroms, and an incremental pore volume maximum at a pore radius greater than about 50 Angstroms;
   between 1 and 15 weight percent of a Group VIB metal measured as an oxide deposited on the support; and between 0.1 and 5 weight percent of nickel measured as an oxide deposited on the support.

2. The catalyst of claim 1 wherein the pore volume of pores having a radius of less than 125 Angstroms is at least 0.6 cc/g.

3. The catalyst of claim 1 wherein the incremental pore volume maximum is located at a radius between 50 Angstroms and 100 Angstroms.

4. The catalyst of claim 1 wherein the incremental pore volume maximum is between about 50 and 60 Angstroms.

5. The catalyst of claim 1 wherein the weight percent of nickel deposited on the support is between 0.4 and 0.9 weight percent.

6. The catalyst of claim 1 wherein the Group VIB metal is molybdenum and the weight percent of the molybdenum deposited on the support is between about 3.0 and 5.2 weight percent and wherein the weight percent of nickel deposited on the support is between about 0.4 and 0.9 weight percent.

7. The catalyst of claim 6 wherein the pore volume of pores having a radius of less than 125 Angstroms is at least 0.6 cc/g.

8. The catalyst of claim 1 wherein the surface area of the catalyst is between about 160 and 210 square meters per gram.

9. A resid hydroprocessing catalyst for use in an ebullated bed hydroprocessing reactor consisting essentially of:

a porous inorganic oxide support having a total surface area of between about 160 and 210 square meters per gram, a total pore volume of between 1.0 and 1.4 cc/g, a pore volume of greater than 0.4 cc/g of pores having a radius less than 125 Angstroms, a pore volume of less than 0.3 cc/g of pores having a radius between 125 and 750 Angstroms, a pore volume between about 0.7 and 0.95 cc/g of pores having a radius less than about 600 Angstroms, a pore volume between about 0.2 and 0.35 cc/g of pores having a radius greater than about 600 Angstroms, and an incremental pore volume maximum at a pore radius of between about 50 and 80 Angstroms;

between 1.0 and 5.2 weight percent of a molybdenum measured as an oxide deposited on the support; and between 0.4 and 0.9 weight percent of a nickel measured as an oxide deposited on the support.

10. The catalyst of claim 9 wherein the pore volume of pores having a radius of less than 125 Angstroms is at least 0.6 cc/g.

11. The catalyst of claim 9 wherein the pore volume of pores having a radius of less than 125 Angstroms is between about 0.7 and 0.9 cc/g.

12. The catalyst of claim 10 wherein the weight percent of molybdenum deposited on the support is between about 3.0 and 5.2 weight percent.

13. The catalyst of claim 10 wherein the incremental pore volume maximum is between about 50 and 60 Angstroms.

* * * * *